(12) United States Patent
Ellis et al.

(10) Patent No.: US 9,819,582 B2
(45) Date of Patent: Nov. 14, 2017

(54) TRAFFIC ON-BOARDING FOR ACCELERATION THROUGH OUT-OF-BAND SECURITY AUTHENTICATORS

(71) Applicant: Akamai Technologies, Inc., Cambridge, MA (US)

(72) Inventors: Andrew B. Ellis, Medford, MA (US); Charles E. Gero, Quincy, MA (US); Andrew F. Champagne, Ware, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 14/672,119

(22) Filed: Mar. 28, 2015

(65) Prior Publication Data
US 2015/0281204 A1    Oct. 1, 2015

Related U.S. Application Data

(60) Provisional application No. 61/972,237, filed on Mar. 29, 2014.

(51) Int. Cl.
*H04L 29/06* (2006.01)
*H04L 12/715* (2013.01)

(52) U.S. Cl.
CPC .......... *H04L 45/64* (2013.01); *H04L 63/0815* (2013.01)

(58) Field of Classification Search
CPC .................. H04L 63/0815; H04L 45/64
See application file for complete search history.

(56) References Cited

U.S. PATENT DOCUMENTS

| 6,286,104 B1* | 9/2001 | Buhle | H04L 63/105 |
| | | | 707/999.009 |
| 2002/0147929 A1* | 10/2002 | Rose | G06F 21/335 |
| | | | 726/10 |

(Continued)

OTHER PUBLICATIONS

PCT/US2015/023206, "Notification of Transmittal of the International Search Report and the Written Opinion of the International Searching Authority, or the Declaration," Jun. 24, 2015.

(Continued)

*Primary Examiner* — Mahfuzur Rahman
(74) *Attorney, Agent, or Firm* — David H. Judson

(57) ABSTRACT

A traffic on-boarding method is operative at an acceleration server of an overlay network. It begins at the acceleration server when that server receives an assertion generated by an identity provider (IdP), the IdP having generated the assertion upon receiving an authentication request from a service provider (SP), the SP having generated the authentication request upon receiving from a client a request for a protected resource. The acceleration server receives the assertion and forwards it to the SP, which verifies the assertion and returns to the acceleration server a token, together with the protected resource. The acceleration server then returns a response to the requesting client that includes a version of the protected resource that points back to the acceleration server and not the SP. When the acceleration server then receives an additional request from the client, the acceleration server interacts with the service provider using an overlay network optimization.

18 Claims, 3 Drawing Sheets

(56) References Cited

U.S. PATENT DOCUMENTS

2002/0178254 A1* 11/2002 Brittenham ........... G06F 9/5027
709/224
2004/0093419 A1  5/2004 Weihl et al.
2012/0008786 A1* 1/2012 Cronk ................... H04L 63/102
380/282
2013/0138957 A1* 5/2013 Dharmarajan ...... H04L 63/0428
713/168

OTHER PUBLICATIONS

European Patent Application No. 15774334.5, Extended European Search Report, dated Jul. 21, 2017, 6 pages.

* cited by examiner

TRAFFIC ON-BOARDING FOR ACCELERATION THROUGH OUT-OF-BAND SECURITY AUTHENTICATORS

BACKGROUND

Technical Field

This application relates generally to overlay networking and, in particular, to techniques to on-board traffic for delivery by an overlay network, such as a content delivery network.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

For content distribution networks such as described above to function effectively and be performant, they must be "in path" between an end user and an origin server. Traditionally, this has been accomplished using a number of technologies, primarily DNS name resolution (e.g., tiered DNS aliasing through CNAMEs, geo-location, anycast, and the like).

This disclosure describes a new method to on-board traffic into the CDN.

BRIEF SUMMARY

The approach herein provides traffic on-boarding for acceleration to an overlay, such as a content delivery network (CDN), through out-of-band security authenticators, such as SAML 2.0-based identity provider schemes.

In one embodiment, a traffic on-boarding method is operative at an acceleration server (e.g., an edge server) of an overlay network. It begins at the acceleration server when that server receives an assertion generated by an identity provider (IdP), the IdP having generated the assertion upon receiving an authentication request from a service provider (SP), the SP having generated the authentication request upon receiving from a client a request for a protected resource. The acceleration server receives the assertion and forwards it to the SP, which verifies the assertion and returns to the acceleration server a token, together with the protected resource. The acceleration server then returns a response to the requesting client that includes a version of the protected resource that points back to the acceleration server and not the SP. When the acceleration server then receives an additional request from the client, the acceleration server interacts with the service provider, preferably using an overlay network optimization.

The approach obviates conventional CDN traffic on-boarding, such as through DNS, and it does not require that a service provider and an acceleration provider (namely, the CDN) maintain any relationship. Accordingly, the acceleration server does not need to have in its possession any certificates and encryption keys that match the domain name of the service provider.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
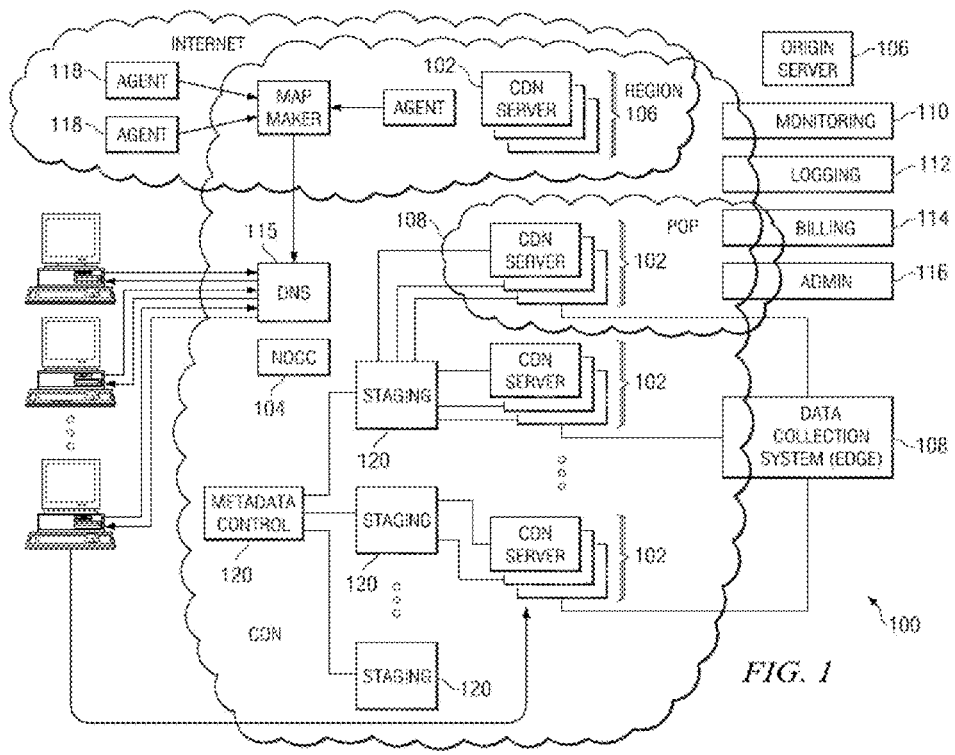
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
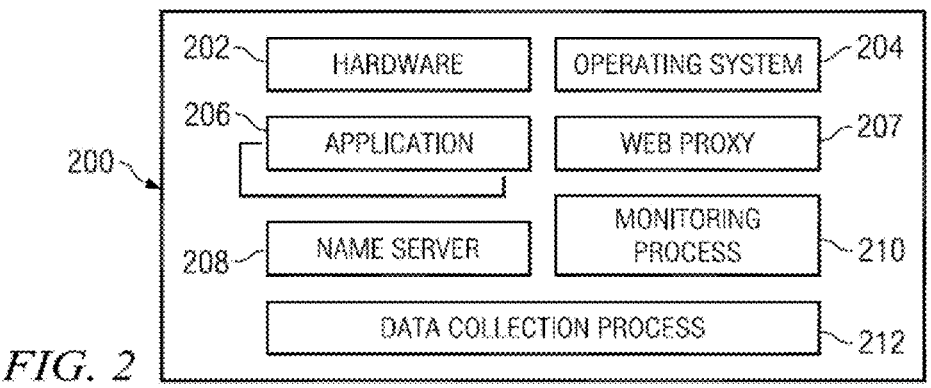
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide various technologies and techniques to accelerate traffic flow between an edge server, on the one hand, and a customer origin server, on the other. These technologies provide acceleration for many different types of interactions, e.g., delivery of dynamic content, edge server interactions with back-end origin infrastructures, and the like. Representative examples include, without limitation, the techniques described in U.S. Pat. No. 8,194,438 (overlay path selection optimization), and U.S. Pat. No. 8,477,837 (content pre-fetching). Other IP, TCP, UDP or application-layer optimizations may be implemented as well to facilitate such acceleration. These techniques are sometimes referred to herein as "overlay network optimizations."

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

By way of additional background, web applications increasingly are becoming more dependent on federated identities and out-of-band authentication. These methods allow independent organizational units to run services that authenticate their users. These services then can be used by any number of online and cloud service providers to enable logins and functionality in their respective systems for the given organizational units. By utilizing this approach, each service provider does not need to maintain copies of the user accounts required for access to the service for each organization. Instead, the service provider accesses the single source of truth, the organizations' authentication services themselves, to determine if access is allowed, who the user accessing content is, and much more.

More specifically, in this type of scheme, known as a "federation," entities cooperate such that users in one entity leverage relationships with a set of entities through an entity's participation in the federation. Users can be granted access to resources at any of the federated entities as if they had a direct relationship with each one. Users are not required to register at each entity and are not required to identify and authenticate themselves.

More formally, a federation is a set of distinct entities (enterprises, logical units within an enterprise, etc.) that cooperate to provide a single-sign-on experience to a user. A federated environment differs from a typical single-sign-on environment in that two entities do not need to have a direct, pre-established, relationship defining how and what information to transfer about a user. Within a federated environment, entities provide services that deal with authenticating users, accepting authentication assertions (e.g., authentication tokens) that are presented by other entities, and translating the identity of the vouched-for user into one that is understood within the local entity. Federation reduces costs and administrative burdens on a service provider, who relies on trusting the federation itself instead of managing authentication information. In operation, a federated environment allows a user to authenticate at a first entity. The first entity provides the user with an authentication "assertion" about the user for use at a second entity. The user can then access protected resources at a second, distinct entity, by simply presenting the authentication assertion that was issued by the first entity. The user does not have to authenticate again at the second entity, but simply passes-in the assertion obtained from the first party.

Specific entities can take on specific roles in the context of a federated environment. An identity provider (IdP) is a specific type of service that provides identity information as a service to other entities within the federation. Typically, the entity that issues assertions is the IdP; once a user obtains an assertion by authenticating to the IdP, the other entities in the federation are service providers for the duration of the particular federated session or transaction.

The Security Assertion Markup Language (SAML) is an XML-based standard for exchanging authentication and authorization data between security domains, such as between an identity provider and a service provider. SAML assumes that a principal (often a user) has enrolled with at least one identity provider, which provides local authentication services to the principal. A service provider relies on the identity provider to identify the principal. At the principal's request, the identity provider passes a SAML assertion to the service provider. On the basis of this assertion, the service provider (SP) makes an access control decision. To facilitate SAML, the IdP and the service providers who trust assertions from that IdP exchange cryptographic and other information about each other's SAML implementation.

Figure 3:
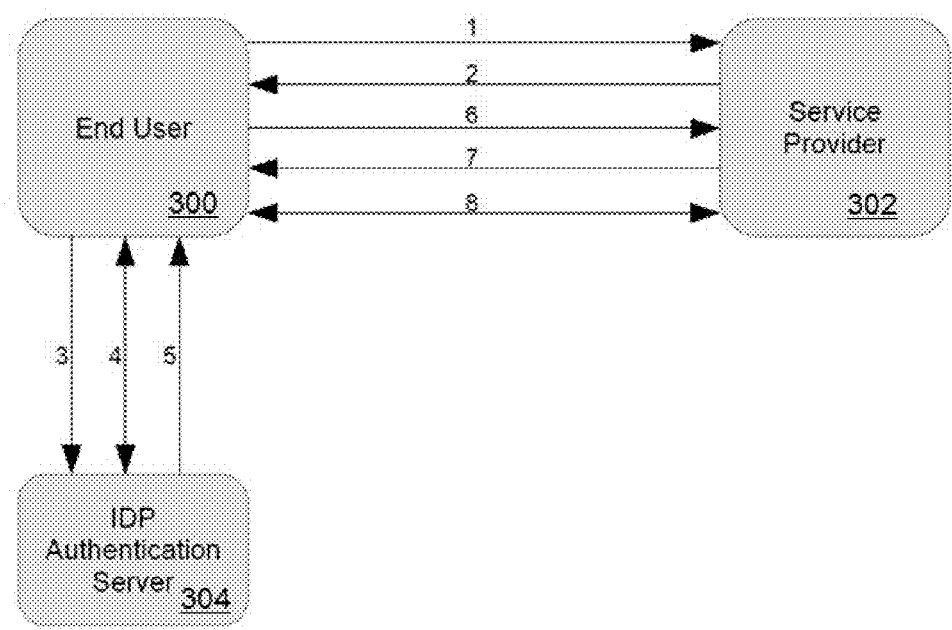
FIG. 3 illustrates a typical identity provider-service provider flow for authentication using an out-of-band authenticator.

FIG. 3 illustrates a typical IdP-SP flow for SAML 2.0 authentication. In this drawing, there is an End User (and, in particular, the user's browser or mobile app) 300 that is seeking a service from a Service Provider 302. The Service Provider is federated with an IdP (IDP Authentication Server) 304.

The process flow is as follows:

1. The End User 300 attempts to access a resource on the service provider system 302.

2. The service provider 302 determines the user is not currently logged-in and redirects (e.g., via an HTTP redirect command) the end user's machine to the IDP Authentication Server 304 with an authentication request.

3. The End User 300 forwards the authentication request to the IDP Authentication Server 304.

4. The IDP Authentication Server 304 logs the user in (through any number of means: password, mutual authentication, biometrics, etc.).

5. The IDP Authentication Server 304 generates an authentication response and signs it cryptographically. It then sends a redirect to the End User 300 instructing the requesting client to go back to the Service Provider 302 with the signed assertion.

6. The End User 300 accesses the Service Provider 302 with the authentication response.

7. The Service Provider 302 verifies the authentication response and signature, and sends back some token to represent the login state with the Service Provider (an HTTP cookie, for example).

8. The End User 300 now accesses the site as a normal logged-in user.

The above-described exchange is typical not only of SAML 2.0 authentication request and response, but also of many other out-of-band authenticators.

This known interaction is modified according to the teachings herein, which are now described, for the purpose of on-boarding traffic for acceleration by an overlay network such as a CDN.

Traffic On-Boarding for Acceleration Through Out-of-Band Security Authenticator

Figure 4:
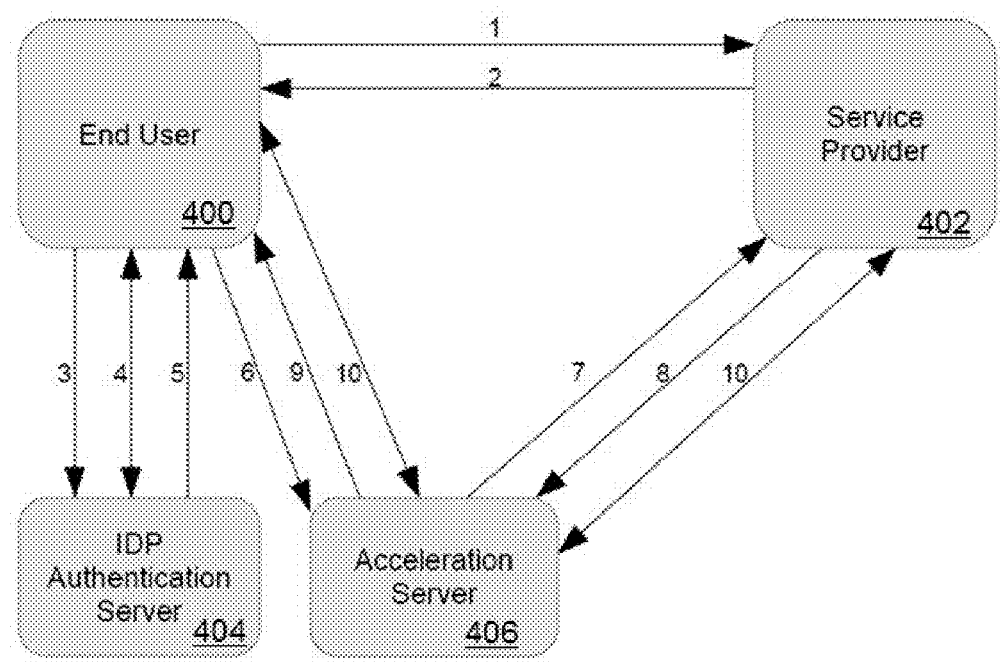
FIG. 4 illustrates a modification of the identity provider—service provider flow in FIG. 3 according to the techniques of this disclosure.

With reference to FIG. 4, the following new process flow is provided. The components shown here correspond to those in FIG. 3, with the addition of an acceleration server ("Acceleration Server") 405. The acceleration server 406 corresponds to a server (such as shown in FIG. 2) of the overlay network (FIG. 1).

1. An end user 400 attempts to access a resource on the service provider system 402.

2. The service provider 402 determines the user is not currently logged-in and redirects the end user's machine to the IdP authentication server 404 with an authentication request.

3. The end user 400 forwards the authentication request to the IdP authentication server 404.

4. The IdP authentication server 404 logs the user in (through any number of means: password, mutual authentication, etc. . . . ).

5. The IDP authentication server 404 generates an authentication response and signs it cryptographically. It then sends a redirect to the end user 400 instructing the requesting client to go the acceleration server 406 with the signed assertion.

6. The end user 400 accesses the acceleration server 406 with the authentication response.

7. The acceleration server 406 forwards the authentication response to the service provider 402.

8. The service provider 402 verifies the Authentication Response and signature, and sends back some token to represent the login state with the service provider (e.g., in an HTTP cookie).

9. The acceleration server 406 then either:

(a) translates the login token to a format suitable for the end user, changing references to the service provider to the acceleration server and sends it to the end user, or (b) stores the token internally and generates a new token associated with the actual token (from step S) and sends the new token to the end user. Additionally, the acceleration server 406 preferably modifies the returned resource through any number of means (e.g., HTML rewriting) such that references within it point to the acceleration server 406 and not to the service provider directly.

10. The end user 400 now communicates with the acceleration server 406, which now accelerates the transactions using one or more methods, such as route optimization, TCP optimization, caching, or any other overlay network optimization technologies or functionality. When a forward connection to the service provider 402 is required, the acceleration server 406 reverses the token process (from step 9 above) to access the service provider 402 with proper credentials.

This completes the processing.

As a variant, and to reduce transaction steps, the acceleration server 406 optionally can function as the IdP authentication server 404.

In another alternative, the acceleration server 406 functions as a surrogate IdP authentication server 404 while communicating back (either directly or through the End User 400 as an intermediary) to the "real" IdP authentication server 404.

An advantage of this method is that the acceleration server does not need to have certificates and keys that match the domain name of the service provider that the user enters into his or her browser (or app) initially. Rather, the approach may rely upon the user's organization (e.g., administrators or others) to configure the service provider to access the accelerated server as an out-of-band authenticator. As such, a completely different hostname and associated certificate and key under the control of the acceleration provider can be used, while allowing the end users to still initially contact the service provider's hostname and verify its associated certificate.

Thus, and unlike the common setup with CDNs mentioned earlier (traffic on-boarding through DNS), the described approach (of traffic on-boarding) does not require the service provider and the acceleration provider (the CDN) maintain any relationship. In particular, because the DNS records for the service provider are not required to be changed (viz., to provide a CNAME that points a SP hostname to a CDN hostname), the system can function without such direct cooperation. As a consequence, the approach shifts the relationship that the acceleration provider must maintain, namely, from the service provider, to the customer(s) of the service provider.

While the technique has been explained in the context of SAML 2.0-based authentication schemes, this is not a limitation, as other out-of-band security authenticators may be used. These include, without limitation, those based on various protocols such Liberty, Shibboleth, OpenID, OAuth 2.0, WS-Trust, WS-Federation, and many others. Generalizing, any system that mandates an end user be redirected to an intermediary for login can be used to perform the above-described method of traffic on-boarding for acceleration.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of an acceleration server itself, namely, by extending its conventional functionality as has been described.

Having described our invention, what is claimed is set forth as follows.

The invention claimed is:

1. A method operative in an overlay network, comprising:
receiving, at an acceleration server of the overlay network, an assertion, the assertion having been generated by an identity provider following receipt, by the identity provider, of an authentication request from a service provider, the authentication request having been generated by the service provider in response to receipt, at the service provider, of a request for a protected resource, the request for the protected resource having been received from a requesting client, wherein at a time of receipt of the request for the protected resource the service provider is not yet associated with the overlay network by having a domain name system (DNS) record that includes a canonical name (CNAME) that points service provider traffic to the overlay network;
forwarding, by the acceleration server, the assertion to the service provider;
receiving, by the acceleration server, a token, the token having been generated by the service provider following verification of the assertion, the token being accompanied by the protected resource;
returning, by the acceleration server, a response to the requesting client, the response operative to cause one or more additional requests from the requesting client to be directed to the acceleration server, or an associated acceleration server, and not to the service provider directly such that the service provider is thereby on-boarded to the overlay network in an automated manner and without requiring the service provider to modify the DNS record to include the CNAME to point to the overlay network; and
performing an overlay network optimization between the acceleration server that receives the additional request and the server provider for at least one such additional request from the requesting client;
wherein the overlay network is a content delivery network (CDN) that provides content delivery to participating content providers, the service provider being a participating content provider after being on-boarded;
wherein the response returned to the requesting client is a modified version of the protected resource, the modified version including at least one Uniform Resource Locator (URL) having an associated reference that points to the acceleration server and not to the service provider.

2. The method as described in claim 1 wherein the identity provider provides an authentication service that is one of: Security Assertion Markup Language, Liberty, Shibboleth, OpenID, OAuth, WS-Trust, and WS-Federation.

3. The method as described in claim 1 wherein the identity provider and the service provider operate in a federation.

4. The method as described in claim 1 further including:
storing the token;
generating a new token;
returning the new token with the response to the requesting client.

5. A method, comprising:
configuring an acceleration server of an overlay network as an out-of-band security authenticator;
receiving at the acceleration server an assertion generated by an identity provider, the identity provider having generated the assertion upon receiving an authentication request from a service provider, the service provider having generated the authentication request upon receiving from a client a request for a protected resource, wherein at a time of receipt of the request for the protected resource the service provider is not yet associated with the overlay network by having a domain name system (DNS) record that includes a canonical name (CNAME) that points service provider traffic to the overlay network;
forwarding the assertion from the acceleration server to the service provider;
receiving at the acceleration server the protected resource together with a token, the token having been generated by the service provider following verification of the assertion;
providing from the acceleration server a version of the protected resource, the version including information to cause an additional request from the client to be directed to the overlay network instead of the service provider such that the service provider is thereby on-boarded to the overlay network in an automated manner and without requiring the service provider to modify the DNS record to include the CNAME to point to the overlay network, or to make available in the overlay network a service provider certificate and cryptographic key used by the service provider to protect one or more resources, the information in the version including at least one Uniform Resource Locator (URL) having an associated reference that points to the acceleration server and not to the service provider; and
receiving and servicing the additional request in the overlay network;
wherein the overlay network is a content delivery network (CDN) that provides content delivery to participating content providers, the service provider being a participating content provider after being on-boarded.

6. The method as described in claim 5 wherein servicing the additional request includes the acceleration server communicating with the service provider over a communication path that is optimized according to one or more overlay network optimizations.

7. The method as described in claim 5 wherein the assertion is a Security Assertion Markup Language-based assertion.

8. The method as described in claim 5 wherein the acceleration server receives the protected resource in response to the service provider verifying the assertion.

9. The method as described in claim 5 wherein the acceleration server is a content delivery network (CDN) edge server.

10. The method as described in claim 1 wherein the acceleration server also functions as the identity provider.

11. The method as described in claim 1 wherein the overlay network optimization is one of: route optimization, Transmission Control Protocol (TCP) optimization and caching.

12. The method as described in claim 1 further including the acceleration server establishing a forward connection to the service provider.

13. The method as described in claim 12 further including the acceleration server accessing the service provider upon presenting a proper credential to the service provider.

14. An apparatus configured as an acceleration server in an overlay network, comprising:
a hardware processor; and
computer memory holding computer program instructions executed by the hardware processor to:
receive an assertion generated by an identity provider, the identity provider having generated the assertion upon receiving an authentication request from a service provider, the service provider having generated the authentication request upon receiving from a client a request for a protected resource, wherein at a time of receipt of the request for the protected resource the service provider is not yet associated with the overlay network by having a domain name system (DNS) record that includes a canonical name (CNAME) that points service provider traffic to the overlay network;
forward the assertion to the service provider;
receive the protected resource together with a token, the token having been generated by the service provider following verification of the assertion;
provide to the client a version of the protected resource, the version including information to cause an additional request from the client to be directed to the overlay network instead of the service provider such that the service provider is thereby on-boarded to the overlay network in an automated manner and without requiring the service provider to modify the DNS record to include the CNAME to point to the overlay network, the information in the version including at least one Uniform Resource Locator (URL) having an associated reference that points to the acceleration server and not to the service provider; and
receive and service the additional request in the overlay network;
wherein the overlay network is a content delivery network (CDN).

15. The apparatus as described in claim 14 wherein the computer program instructions are further operative to perform an overlay network optimization with respect to the additional request.

16. The apparatus as described in claim 14 wherein the assertion is a Security Assertion Markup Language-based assertion.

17. The apparatus as described in claim 14 wherein the computer program instructions are further operative to establish a forward connection to the service provider.

18. The apparatus as described in claim 17 wherein the computer program instructions are further operative to access the service provider upon presenting a proper credential to the service provider.

\* \* \* \* \*